United States Patent [19]
Hsu

[11] Patent Number: 5,901,318
[45] Date of Patent: May 4, 1999

[54] METHOD AND SYSTEM FOR OPTIMIZING CODE

[75] Inventor: Wei Chung Hsu, Cupertino, Calif.

[73] Assignee: Hewlett-Packard Company, Palo Alto, Calif.

[21] Appl. No.: 08/643,670

[22] Filed: May 6, 1996

[51] Int. Cl.$^6$ .................................................. G06F 9/44
[52] U.S. Cl. ...................................................... 395/709
[58] Field of Search .......................................... 395/709

[56] References Cited

U.S. PATENT DOCUMENTS

| | | | |
|---|---|---|---|
| 5,121,498 | 6/1992 | Gilbert et al. | 395/708 |
| 5,265,253 | 11/1993 | Yamada | 395/709 |
| 5,450,585 | 9/1995 | Johnson | 395/709 |
| 5,507,030 | 4/1996 | Sites | 395/704 |
| 5,511,198 | 4/1996 | Hotta | 395/709 |
| 5,577,253 | 11/1996 | Blickstein | 395/705 |

*Primary Examiner*—Tariq R. Hafiz
*Assistant Examiner*—John Q. Chavis

[57] ABSTRACT

An optimizing compiler for optimizing code in a computer system having a CPU and a memory. The code has a loop wherein the loop includes statements conditionally executed depending on the evaluation of a control flow statement. The inventive compiler separates the code into a index collection phase and an execution phase. The index collection phase collects array indices indicating whether the control flow statement evaluates true for each particular loop iteration. The execution phase builds self loops without conditional statements. The self loops use the array indices to execute only the loop instructions that should be executed. Since those instruction are predetermined by the index collection phase, performance enhancement features of the CPU, such as branch prediction, pipelining, and a superscalar architecture can be fully exploited.

23 Claims, 2 Drawing Sheets

METHOD AND SYSTEM FOR OPTIMIZING CODE

TECHNICAL FIELD OF THE INVENTION

This invention pertains generally to compilers and more particularly to compilers for optimizing loops for execution on modern microprocessors.

BACKGROUND OF THE INVENTION

Modern microprocessors use a variety of techniques, such as pipelining and superscalar architectures, to improve performance. Pipelining occurs when a processor starts execution of an instruction sequence before a previous instruction sequence is completed in order to increase processing speed.

A major problem with pipelining occurs when instructions have control or data dependencies. A control dependency occurs when an instruction's execution is conditioned upon the results of a branching instruction. A data dependency occurs when the processing of an instruction must be completed before additional instructions may be executed. When these problems occur, the flow through the pipeline is stopped and the processor's efficiency drops while the processor deals with the problem.

There are several pipeline enhancements used to alleviate the above problems. These enhancements include branch prediction, dynamic scheduling, and predicated execution. To perform branch prediction, the processor keeps track of the most likely direction of a branch, based upon a record of past history. If a branch is usually taken, the processor speculates that the branch will be taken this time and loads the pipeline with instructions at the new branch address. Of course, if the branch usually is not taken, then the processor continues to load the pipeline from the current series of instructions. If the processor guesses incorrectly, however, the processor suffers a major performance hit when returning to the mispredicted branch.

Processors use dynamic scheduling when a second instruction in the pipeline is dependent on the results of a first instruction. A processor deals with this problem by using a reorder queue to reschedule non-dependent instructions to execute before the second instruction. Once the first instruction is complete, execution of the second instruction will begin.

Predicated execution can be used in processors having a very long instruction word (VLIW) format. In such processors, the instruction word specifies a predicate register. Whether the instruction is executed depends upon the value in the register. Predicated execution is useful because it removes conditional branches and produces more easily pipelined straight-line code.

Another performance-enhancing technique used by modern processors is utilizing a superscalar architecture. A processor with a superscalar architecture has the ability to issue two or more instructions in parallel. In addition, superscalar designs are usually implemented with multiple pipelines and duplication of major computational functional units. The concept behind superscalar processors is to exploit parallelism that is inherent in programs.

However, many of the problems that exist with pipelining are exacerbated by superscalar processors. For example, the data dependency and branching issues described above are made worse. In superscalar processors, a problem can stall multiple pipelines, preventing the parallel execution of many instructions. Likewise, mispredicted branches can cause the contents of all pipelines to be dumped.

The problems inherent in pipelining and superscalar processors are particularly apparent when the processor is executing a loop containing control flow statements. For example, consider the following loop:

```
            DO 10 I = 1,N
                statement 1;
                IF (cond) GO TO 10
                statement 2; access A(I)
                statement 3; access B(I)
                statement 4; access C(I)
         10 CONTINUE
```

The conditional branch inside the loop (the IF statement) may be highly mispredicted depending on the design of the hardware branch prediction scheme.

In addition, dynamic scheduling is ineffective when all the instructions in the reorder queue are data dependent. For example, if the above loop has high intra-iteration data dependencies, then one iteration of the loop may have more instructions than can fit in the reorder queue. In such a case, there is little parallelism for the dynamic scheduling hardware to exploit.

Moreover, functional units, such as floating point division and square root (Fdiv/Sqrt) units, are usually not pipelined. Instead, such units are connected in parity with the reorder queue. For example, a Fdiv instruction in the even parity of the reorder queue cannot be launched to a Fdiv/Sqrt functional unit attached to odd parity. For loops with instruction calls to functional units embedded in control statements, it is very hard to schedule the calls to the correct parity.

In addition, loop unrolling is a common technique used during compilation to exploit instruction level parallelism (ILP). When loop unrolling, the compiler replicates the body of a loop and thereby reduces the iterations necessary to execute the loop. Loop unrolling makes more instructions available for inter-iteration ILP. Loop unrolling, however, is not as effective for exploiting ILP in loops containing control flow statements.

Accordingly, there is a need in the art for a way to minimize the high penalties associated with branch mispredictions.

There is another need in the art for a way to enable more effective dynamic scheduling of loops.

There is yet another need in the art for a way to enable more efficient non-pipelined functional unit scheduling.

There is yet another need in the art for a way to exploit ILP in loops having control flow statements.

SUMMARY OF THE INVENTION

The above and other needs are met by a method and system for program compilation that performs a compressed index loop split (CILS) on program code. The CILS transformation turns loops with control flow statements into loops without control flow statements, also known as "self loops." Self loops can be effectively software pipelined or loop unrolled for better scheduling.

CILS breaks a loop with control statements into two separate phases: 1) an index collection phase; and 2) an execution phase. The first phase collects array indices that will actually be used in the conditional statements. The second phase performs the loop's required computations.

Consider the loop discussed above. CILS transforms the loop as follows:

```
        j = 1
        DO 10 I = 1,N
            statement 1;
            IF (cond) GO TO 10
            index(j) = I
            j = j + 1
    10  CONTINUE
        DO 20 K = 1j-1
            kk = index(K)
            statement 2; access A(kk)
            statement 3; access B(kk)
            statement 4; access C(kk)
    20  CONTINUE
```

Note that the first loop collects the induction (index) variable when condition "cond" is false. Then, the second loop uses the collected indices to compute the required work.

Depending on how frequently the condition is false, the second loop may iterate many fewer times than the first loop. Predicated and speculative execution operating on the original loop would often execute most of the instructions in statements 2, 3, and 4 even when they were not required. Thus, the reduction in execution brought about by CILS is a distinct advantage. The advantage is even greater when the computations in statements 2, 3, and 4 are time or resource expensive (i.e., containing many instructions or expensive operations such as divides).

A technical advantage of the present invention is more effective dynamic scheduling. CILS allows instructions from multiple iterations to exist in the re-order queue for parallel execution.

Another technical advantage of the present invention is more effective non-pipelined functional unit scheduling. The execution loop produced by CILS is a self loop that can be easily scheduled to the various functional units.

Yet another technical advantage of the present invention is reduction of the number of branch mispredictions. With CILS, the remaining conditional branches in the first phase may be eliminated due to IF conversion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
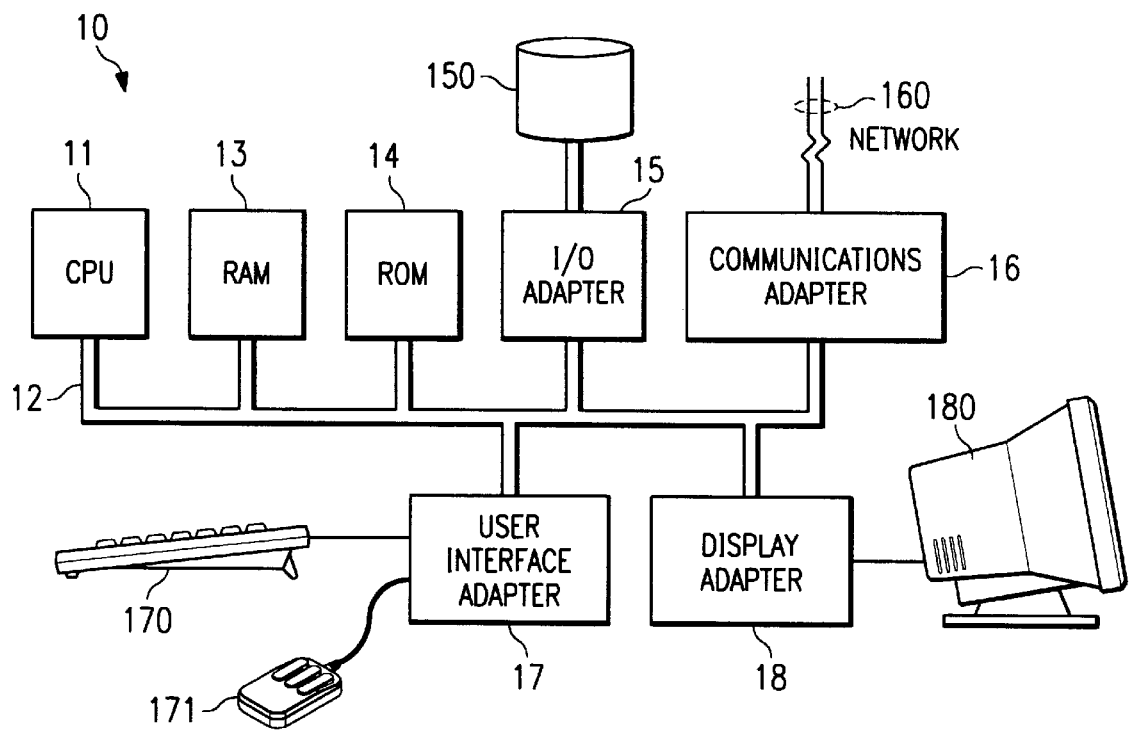
FIG. 1 illustrates a computer system adapted to execute a compiler according to the present invention.

FIG. 1 illustrates computer system 10 adapted to execute the present invention. Central processing unit (CPU) 11 is coupled to bus 12, which in turn is coupled to random access memory (RAM) 13, read only memory (ROM) 14, input/output (I/O) adapter 15, communications adapter 16, user interface adapter 17, and display adapter 18.

CPU 11 may be any general purpose CPU, such as a HP PA-8000. CPU 11 preferably has a reduced instruction set (RISC) architecture and supports dynamic execution features for high performance such as pipelining, branch prediction, and speculative and out of order execution. In addition, CPU 11 may have a superscalar architecture and multiple functional units such as Fdiv/Sqrt functional units. However, the present invention is not restricted by the architecture of CPU 11. Thus, the present invention can be adapted to work with computers having complex instruction set CPUs with, for example, non-pipelined operation.

RAM 13 and ROM 14 hold user and system data and programs as is well known in the art. I/O adapter 15 connects storage devices, such as hard drive 150, to the computer system. Communications adaption 16 is adapted to couple the computer system to a local or wide-area network 160. User interface adapter 17 couples user input devices, such as keyboard 170 and pointing device 171, to the computer system. Finally, display adapter 18 is driven by CPU 11 to control the display on display device 180. As is well known in the art, an optimizing compiler embodying the present invention preferably resides on hard drive 150 and executes from RAM 13 on CPU 11.

Figure 2:
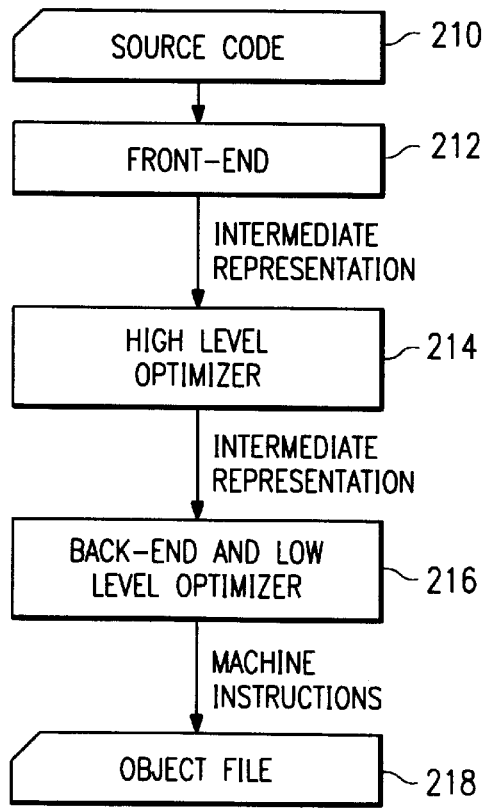
FIG. 2 illustrates the general structure of a compiler system.

FIG. 2 is a flow chart illustrating the general structure of a compiler system according to the present invention. Source code 210 is written by a programmer and typically saved to a data file. Next, the data file is input to compiler front end 212. Front end 212 transforms the code into an intermediate representation, which is then input to high level optimizer 214. High level optimizer 214 again transforms the code and inputs the resulting intermediate representation to back end and low level optimizer 216. Optimizer 216 produces machine instructions which are saved in object file 218 for eventual linking and execution.

The present invention preferably resides within back end 216. More precise information about estimated loop split overhead and available instruction level parallelism (ILP) is available at the back end. However, the present invention could also be implemented within high level optimizer 214 or even within front end 212.

The present invention uses a compressed index loop split (CILS) to transform loops with control flow structures into code that can be more efficiently compiled and executed on CPU 11. Consider the following loop with an IF_THEN_ ELSE control flow statement:

```
    1        DO 10 I = 1,N
    2            statement 1;
    3            IF (cond) THEN
    4                statement 2; access A(I)
    5                statement 3; access B(I)
    6                statement 4; access C(I)
    7            ELSE
    8                statement 5; access D(I)
    9            ENDIF
    10           statement 6;
    11  10  CONTINUE
```

The DO statement on line 1 causes the code to loop from line 2 to line 9 'N' times. Statement 1, on line 2, and statement 6, on line 10, are executed during each iteration of the loop. Statements 2–4, however, are only executed if condition "cond" is true. If "cond" is false, then statement 5 is executed.

The inventive compiler transforms the above code loop as follows:

```
1       j = 1
2       k = 1
3       DO 10 I = 1,N
4           statement 1;
5           IF (cond) THEN
6               indexT(j) = I
7               j = j + 1
8           ELSE
9               indexF(k) = I
10              k = k + 1
11          ENDIF
12  10  CONTINUE
13
14      DO 20 I = 1,j-1
15          kk = indexT(I)
16          statement 2; access A(kk)
17          statement 3; access B(kk)
18          statement 4; access C(kk)
19  20  CONTINUE
20
21      DO 30 I = 1,k-1
22          kk = indexF(I)
23          statement 5; access D(kk)
24  30  CONTINUE
25
26      DO 40 I=1,N
27          statement 6;
28  40  CONTINUE
```

As can be seen from the above transformed code, the original code has been split into two general phases: 1) an induction (index) collection phase; and 2) an execution phase.

The index collection phase begins at line 1 and continues through line 12. At lines 1–2, the induction variables, j and k, are each initialized to '1.' Next, from lines 3–12, a DO loop executes from 1 to 'N' and collects the induction variables in arrays. When "cond" is true, the code at line 6 saves the value of 'I' into the indexT array at location 'j.' In addition, the 'j' variable is incremented. Likewise, when "cond" is false, the code at line 9 saves the value of 'I' into the indexF array at location 'k' and increments the 'k' variable.

The execution phase begins at line 14 and continues through line 28. From line 14 through line 19, the code loops once for each time a value was saved in the indexT array at line 6. Then, from lines 16–18, the code executes statements 2–4. Next, from lines 21–24, the code loops once for each time a value was saved in the indexF array at line 9. At line 23, the code executes statement 5. Finally, at lines 26–28, the code loops and executes statement 6.

As illustrated above, the CILS transformation turns loops with control statements into self loops. Self loops can be effectively software pipelined or loop unrolled for better scheduling on CPU 11 in a manner well-known in the art.

Although the index collection loop from lines 3–12 has conditional branches, the conditional block is often simple enough for if-conversion to straight-line code. In other words, the control dependence caused by the IF statement can be converted into data dependence based upon a predicate register. In addition, it is important to note that the present invention can be adapted to work with any type of conditional control flow statement and is not limited to IF_THEN_ELSE statements.

Loop splitting, as described above, enables the exploitation of inter-iteration instruction level parallelism for not-pipelined loops. Sometimes, however, it is not desirable to split the loop because of the added overhead resulting from the split code. Accordingly, the inventive compiler must decide whether to perform a CILS on the code.

Figure 3:
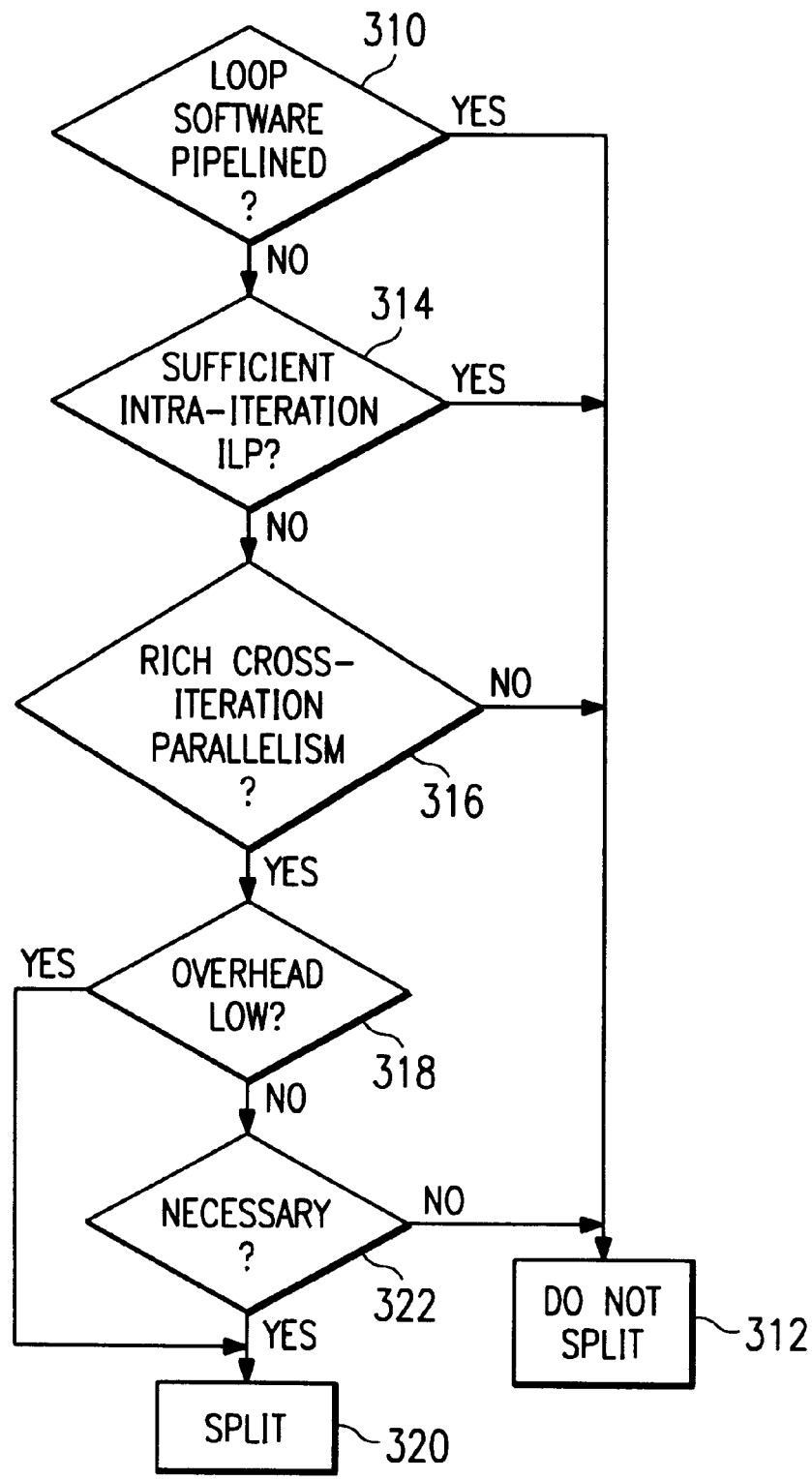
FIG. 3 is a high-level flow chart illustrating the decision making process followed when deciding whether to perform a CILS on a loop.

FIG. 3 is a high-level flow chart illustrating the decision making process followed by the inventive compiler when deciding whether to perform a CILS on a loop. At step 310, the compiler determines whether the loop is already software pipelined. Software pipelining is a compiler transformation allowing execution of multiple loop iterations to overlap. If the loop is already software pipelined, then the loop is not split (step 312) because the code is already using inter-iteration ILP. Therefore, performing a CILS will not enhance its execution. Otherwise, the compiler moves to step 314.

Next, at step 314, the compiler considers whether the loop has sufficient intra-iteration ILP. If the loop already has sufficient ILP, then the benefit from loop splitting will be minimal. Accordingly, the loop is not split (step 312). Otherwise, the compiler moves to step 316.

At step 316, the compiler determines whether the loop has rich inter-iteration parallelism. Note that whether inter-iteration parallelism is "rich," along with the other subjective decisions within the process of FIG. 3, is determined by comparing the loop against a value either predetermined by the compiler designer or set by the programmer. If the loop lacks rich inter-iteration parallelism, then the loop will not benefit from CILS because there is insufficient parallelism for CILS to exploit. Accordingly, the compiler moves to step 312. If the loop has such parallelism, then the compiler moves to step 318.

At step 318, the compiler considers the overhead introduced when CILS transforms the code. If the added overhead is low, then the loop should be split (step 320). If the added overhead is substantial, however, then the compiler moves to step 322.

At step 322, the compiler considers whether inter-iteration ILP is really necessary. In other words, the compiler considers whether the benefits from inter-iteration ILP gained by CILS outweigh the resulting overhead. If so, then the compiler performs the split (step 320). If not, then the loop is not split (step 312).

As stated above, one benefit of CILS is that it allows more effective dynamic scheduling. Dynamic scheduling is ineffective when all of the instructions in the reorder queue are data dependent. By reducing the number of instructions in a loop, and, therefore, the length of the data dependency chains, CILS allows instructions from multiple iterations of the loop to simultaneously exist in the reorder queue for parallel execution.

In addition, CILS enables desirable functional unit scheduling. Fdiv/Sqrt functional units, for example, are usually not pipelined. To avoid expensive cross connections, such functional units are usually connected to queue parity. For instance, a Fdiv instruction in the even parity of the reorder queue cannot be launched to the Fdiv/Sqrt functional unit attached to odd parity even if it would be more efficient to do so. Thus, for loops with Fdiv/Sqrt instructions embedded in control statements, it is impossible to schedule the instruction to the right parity due to the unpredictability of the branch.

In contrast, it is very easy to schedule different iterations of self loops to a particular parity. CILS moves instructions embedded in the conditional statements into execution loops. Execution loops are self loops and, therefore, easily scheduled.

Moreover, CILS reduces effects of branch mispredictions. CILS eliminates many branches through if-conversion, thereby reducing the number of branches that can be mispredicted.

CILS is desirable even on future processors augmented with predicated execution and speculative execution support. CILS will be preferred when a block of code is deemed undesirable for predication or speculation. For example, it is generally not profitable to predicate a large block that is infrequently executed. In addition, if predicated execution is implemented via nullification (the predicated instruction may launch, but the results are nullified later so that the issue of the instruction does not need to wait for the predicate to be ready), there will be a cost associated with an instruction using a non-pipelined functional unit. With the CILS approach of the present invention, there is no need to launch unnecessary operations.

Although the present invention and its advantages have been described in detail, it should be understood that various changes, substitutions and alterations can be made herein without departing from the spirit and scope of the invention as defined by the appended claims.

What is claimed is:

1. A method of compiling code having a loop, the loop having a control flow statement, in a computer system, comprising the steps of:

retrieving, under direction of the computer system, the code to be compiled;

generating induction phase code from the retrieved code loop, wherein the induction phase code evaluates the control flow statement of the retrieved code loop and collects index information therefrom; and generating execution phase code from the retrieved code loop, wherein the execution phase code uses the collected index information to implement a control flow defined by the control flow statement in the retrieved code loop.

2. The method of claim 1, wherein the control flow statement is a conditional statement.

3. The method of claim 1, wherein the control flow statement is a conditional skip statement.

4. The method of claim 1, wherein the induction phase code and the execution phase code each contain a self loop.

5. The method of claim 1, further comprising the step of: evaluating whether to perform the generating steps.

6. The method of claim 5, wherein the evaluating step comprises the step of:

determining whether the loop is software pipelined.

7. The method of claim 6, further comprising the step of:

if the loop is not pipelined, determining whether an intra-iteration parallelism of the loop satisfies a first value.

8. The method of claim 7, further comprising the steps of:

if the loop does not satisfy the first value for the intra-iteration parallelism, determining whether an inter-iteration parallelism of the loop satisfies a second value;

if the loop satisfies the second value for the inter-iteration parallelism, determining overhead added by the generating steps; and if the added overhead is low, performing the generating steps.

9. The method of claim 8, further comprising the steps of:

if the added overhead is high, determining whether inter-iteration parallelism is necessary; and if inter-iteration parallelism is necessary, performing the generating steps.

10. A compiler for execution on a computer system, the compiler comprising:

means for retrieving code from a memory, the code including a loop having a control flow statement; and means for separating the code loop into a first phase and a second phase, wherein:

the first phase collects information indicating whether computations following the control flow statement should be executed; and the second phase uses the collected information to only execute the computations that should be executed.

11. The compiler of claim 10, wherein the collected information is index information.

12. The compiler of claim 10, wherein the control flow statement is a conditional statement.

13. The compiler of claim 10, wherein the control flow statement is a conditional skip statement.

14. The compiler of claim 10, wherein the first phase and the second phase each contain a self loop.

15. The compiler of claim 10, further comprising:

means for evaluating whether to separate the code.

16. The compiler of claim 15, wherein the evaluating means comprises:

means for determining whether the loop is software pipelined;

means for determining whether an intra-iteration parallelism of the loop satisfies a first value, if the loop is not software pipelined;

means for determining whether an inter-iteration parallelism of the loop satisfies a second value, if the loop does not satisfy the first value for the intra-iteration parallelism;

means for determining overhead added by the separating means if the loop satisfies the second value for the inter-iteration parallelism;

means for performing the separating if the added overhead is low;

means for determining whether inter-iteration parallelism is necessary if the added overhead is high; and means for performing the separating if inter-iteration parallelism is necessary.

17. A computer program product having a computer readable medium having computer program logic recorded thereon for compiling code including a loop containing a control flow statement in a computer system having a CPU and a memory, the computer program product comprising:

means, executing on the CPU, for retrieving the code from the memory; and means for generating a first code phase from the loop, wherein the first code phase evaluates the control flow statement for each iteration of the loop and stores information indicating results of the evaluations;

means for generating a second code phase from the loop, wherein the second code phase uses the stored information to perform instructions within the loop.

18. The computer program product of claim 17, wherein the stored information is index information.

19. The computer program product of claim 17, wherein the control flow statement is a conditional statement.

20. The computer program product of claim 17, wherein the control flow statement is a conditional skip statement.

21. The computer program product of claim 17, wherein the first phase and the second phase each contain a self loop.

22. The computer program product of claim 17, further comprising:

means for evaluating whether to separate the code.

23. The computer program product of claim 22, wherein the evaluating means comprises:

means for determining whether the loop is pipelined;

means for determining whether an intra-iteration parallelism of the loop satisfies a first value, if the loop is not pipelined;

means for determining whether an inter-iteration parallelism of the loop satisfies a second value, if the loop does not satisfy the first value for the intra-iteration parallelism;

means for determining overhead added by the separating means if the loop satisfies the second value for the inter-iteration parallelism;

means for performing the separating if the added overhead is low;

means for determining whether inter-iteration parallelism is necessary if the added overhead is high; and means for performing the separating if inter-iteration parallelism is necessary.

* * * * *